United States Patent [19]
Windrem

[11] Patent Number: 5,315,390
[45] Date of Patent: May 24, 1994

[54] SIMPLE COMPOSITING SYSTEM WHICH PROCESSES ONE FRAME OF EACH SEQUENCE OF FRAMES IN TURN AND COMBINES THEM IN PARALLEL TO CREATE THE FINAL COMPOSITE SEQUENCE

[75] Inventor: Kevin D. Windrem, Grass Valley, Calif.

[73] Assignee: The Grass Valley Group, Inc., Nevada City, Calif.

[21] Appl. No.: 42,223

[22] Filed: Apr. 2, 1993

[51] Int. Cl.$^5$ .................. H04N 5/262; H04N 5/265; H04N 5/272; H04N 9/74
[52] U.S. Cl. .................. 348/584; 348/715
[58] Field of Search .......... 358/160, 183, 22, 108, 358/335, 342, 185; 360/14.1, 33.1; H04N 5/265, 5/262, 5/272, 9/74

[56] References Cited

U.S. PATENT DOCUMENTS

| | | | |
|---|---|---|---|
| 4,266,242 | 5/1981 | McCoy | 358/22 |
| 4,302,776 | 11/1981 | Taylor et al. | 358/160 |
| 4,360,831 | 11/1982 | Kellar | 358/183 X |
| 4,688,106 | 8/1987 | Keller et al. | 358/342 |
| 4,821,121 | 4/1989 | Beaulier | 358/160 |
| 4,876,600 | 10/1989 | Pietzsch et al. | 358/183 |
| 4,947,257 | 8/1990 | Fernandez et al. | 358/183 |
| 5,090,909 | 2/1992 | Kellar et al. | 358/183 X |
| 5,107,252 | 4/1992 | Traynar et al. | 358/22 X |
| 5,117,283 | 5/1992 | Kroos et al. | 358/22 |

*Primary Examiner*—Mark R. Powell
*Assistant Examiner*—John W. Miller
*Attorney, Agent, or Firm*—Francis I. Gray

[57] ABSTRACT

A simple compositing system for combining sequences of images, including graphics and video images, records the sequences onto a disk recorder. A frame from each sequence in turn is processed by a digital picture manipulator channel and stored in a respective frame store. Once one frame from each sequence is processed and stored, the frames from the frame stores are combined in a video combiner to form a composite frame, which is read back into the disk recorder. All of the frames of the sequences are combined in this manner to form composite frames, the totality of composite frames producing a final composite image sequence stored in the disk recorder. The final composite image sequence is then transferred to an output device in real time.

5 Claims, 1 Drawing Sheet

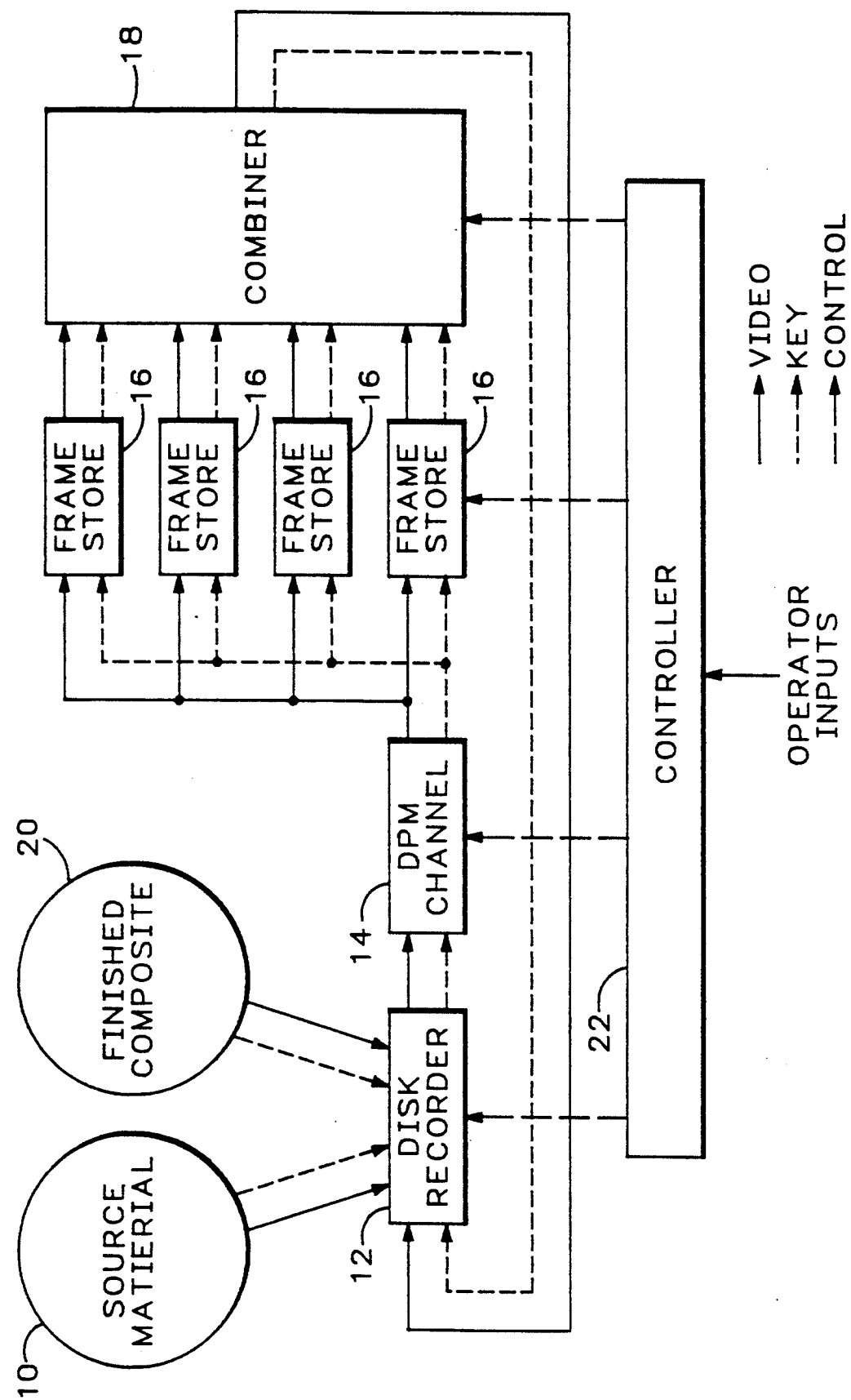

SIMPLE COMPOSITING SYSTEM WHICH PROCESSES ONE FRAME OF EACH SEQUENCE OF FRAMES IN TURN AND COMBINES THEM IN PARALLEL TO CREATE THE FINAL COMPOSITE SEQUENCE

BACKGROUND OF THE INVENTION

The present invention relates to television compositing systems, and more particularly to a simple compositing system for combining many image sequences into a final composite image sequence using a minimum of hardware.

Television post-production involves the combination of many image sequences into a final composite image sequence. These image sequences typically represent the projection of a three-dimensional (3D) object onto a monitor screen. Generally these objects do not fill an entire television raster scan active picture area, and are sometimes translucent. Also these objects are usually in motion. 3D graphics rendering computers are a common source of artificial image sequences. Generation of the graphics image sequence is usually slow (less than ten frames per second to minutes or hours per frame depending upon the complexity of the objects in the image sequence). A digital picture manipulator (DPM), such as the Kaleidoscope DPM manufactured by The Grass Valley Group, Inc. of Grass Valley, California, United States of America, can transform a two-dimensional (2D) image into a 3D projection on the monitor screen. The input to and output from the DPM is typically video having moving objects. While the DPM output is similar to a rendering computer, the DPM's role is one of processing video from some other source rather than generating the video. Also the DPM processes video in real time (25 or 30 frames per second).

The output of a rendering computer is often combined with other video from other sources, such as video recorders, cameras and the like. Likewise the outputs of several DPM channels are combined. Combination of a rendered graphics image with one or more images processed via DPMs is common as well. The most common mechanism for integrating rendered images with realtime video source material is to record the graphics image on a disk-based recorder one frame at a time. The disk recorder is then capable of realtime playback. The rendering computer is usually not considered to be part of a realtime compositing system. Rather it does its job off line and stores its result on the disk recorder or a pair of video tape recorders (one for video and the other for key). That temporary storage is then moved (logically or physically) into the compositing room.

A typical DPM has several processing channels and a combiner which composites the outputs of the DPM channels. Some DPMs, such as the Kaleidoscope DPM, have an extra input to the combiner that allows the video and key from an external device to be merged with the DPM channel outputs. This input is not processed by the DPM and may include graphics image sequences. In this configuration the combiner's output typically is a full screen image and no key signal is required. However, the combiner's output may not be full screen, in which case a key signal also is recorded on a second recording device. The primary drawback of this type of compositing system is its cost, but the system does composite images in real time. The cost is in the playback and recording devices as well as the DPM channels, each of which cost in excess of $100,000.00.

What is desired is a simple compositing system that combines images from several sources, including graphics images and video images, in an inexpensive manner.

SUMMARY OF THE INVENTION

Accordingly the present invention provides a simple compositing system for combining image sequences from several sources, including graphics and video images, in an inexpensive manner. All source materials that contribute to a final composite image sequence are recorded onto a disk recorder, one layer at a time in real time. To create the final composite image sequence one frame of each image sequence, corresponding to a layer in the final composite image sequence, is output in turn from the disk recorder, processed by a DPM channel and stored in one of a plurality of corresponding frame stores at the input to a video combiner. When all of the frame stores necessary to create the final composite image sequence have been loaded with a processed frame, the video combiner constructs a composite frame. The composite frame is recorded back onto the disk recorder. This process repeats until all of the frames are composited. The final composite image sequence, being the totality of the composite frames, is then output to an external device, such as a video tape recorder, from the disk recorder in real time.

The objects, advantages and other novel features of the present invention are apparent from the following detailed description when read in conjunction with the appended claims and attached drawing.

BRIEF DESCRIPTION OF THE DRAWING

The FIGURE is a block diagrammatic view of a simple compositing system according to the present invention.

DESCRIPTION OF THE PREFERRED EMBODIMENT

Referring now to the Figure a plurality of sources provide source material 10 that is sequentially stored in real time on a video digital disk recorder 12. The number of image sequences stored on the disk recorder 12 correspond to the number of image layers that are to be composited into a final composite image sequence. A frame from each image sequence in turn is processed by a single digital picture manipulator (DPM) channel 14. The processed image frames are then stored into respective frame stores 16. Each frame store 16 represents a layer of the final composite image. Once one frame from each image to be composited is loaded into the frame stores 16, the frames are input in parallel to a video combiner 18 to produce a composited frame. The composited frame is then written back into the disk recorder 12.

Once all of the image sequences from the disk recorder 12 have been processed by the DPM channel 14, combined by the video combiner 18 and stored back into the disk recorder as composite frames, the final composite image sequence, being the totality of the composite frames, is read from the disk recorder and output to an external device 20, such as a video tape recorder, in real time. Since the disk recorder 12 plays back the final composite image sequence in real time, the final composite image sequence may be broadcast directly "on air" if desired, rather than being recorded.

A controller 22 provides commands to each element of the compositing system according to operator inputs which define the desired final composite image sequence. Some commands control whether the disk recorder 12 is reading in or playing back and provide the necessary addressing. Other commands control the DPM channel 14 according to the particular transform that is desired for each image frame. Still other commands enable the frame stores 16 to receive the appropriate processed frame, and then to output all of the frames simultaneously to the video combiner 18. Finally commands are provided to the video combiner 18 to perform the appropriate compositing of the frames from the frame stores 16 to produce the composite frames.

The simple compositing system described above does not operate in real time. For example a five-second long composite image sequence that consists of three layers requires twenty seconds, three frame periods to load the frame stores plus one to record the composite. Therefore, since the simple compositing system does not process video in real time, unlike realtime processing hardware which usually requires dedicated circuitry for each operation and is heavily pipelined, the video combiner 18 may be realized with a high performance digital signal processor (DSP) chip/chip set. The resulting savings in hardware cost more than make up for the loss of realtime capability where realtime processing is not required.

Thus the present invention provides a simple compositing system for combining images, including graphics and video images, using an inexpensive hardware implementation relative to a realtime compositing system.

What is claimed is:

1. A simple compositing system comprising:
    means for storing sequences of images from a plurality of sources;
    means for processing the sequences of images from the storing means, the processing means processing one frame from each image sequence in turn;
    a plurality of frame stores, coupled to receive the processed frames from the processing means, store the processed frames, one frame store for each image sequence being composited; and
    means for combining simultaneously the processed frame from each of the frame stores after one frame for each image to be composited is loaded into the frame stores to produce a composite frame, which composite frame is stored in the storing means together with other composite frames, the totality of composite frames forming a final composite image sequence.

2. A simple compositing system as recited in claim 1 further comprising an output device for receiving the final composite image sequence from the storing means.

3. A simple compositing system as recited in claim 1 further comprising means for controlling the storing means, the processing means, the frame stores and the combining means so that the sequences of images are composited to produce the final composite image sequence in the storing means according to operator inputs.

4. A method of compositing sequences of images to form a final composite image sequence comprising the step of:
    recording each sequence of images in a storing device;
    processing each sequence of images in a video processor, one frame being processed in turn from each sequence of images;
    storing the processed frames for each sequence of images from the video processor in respective frame stores;
    combining the processed frames from the frame stores to produce a composite frame;
    reading the composite frame back into the storing device; and
    repeating the processing, storing, combining and reading steps until all of the frames of the sequences of images have been composited, the resulting plurality of composite frames forming the final composite image sequence.

5. The method as recited in claim 4 further comprising the step of playing back the final composite image sequence from the storing device to an output device.

* * * * *